US006631194B2

United States Patent
Fukuoka

(10) Patent No.: US 6,631,194 B2
(45) Date of Patent: Oct. 7, 2003

(54) OPENABLE EYEWEAR TEMPLE STRUCTURE

(75) Inventor: Hiroshi Fukuoka, Sabae (JP)

(73) Assignee: Euro Vision Co., Ltd., Sabae (JP)

(*) Notice: Subject to any disclaimer, the term of this patent is extended or adjusted under 35 U.S.C. 154(b) by 0 days.

(21) Appl. No.: 10/141,343

(22) Filed: May 9, 2002

(65) Prior Publication Data

US 2003/0147045 A1 Aug. 7, 2003

(30) Foreign Application Priority Data

Feb. 7, 2002 (JP) ........................................ 2002-073284

(51) Int. Cl.[7] .............................. G02C 5/16; G02C 5/22
(52) U.S. Cl. ........................................ 381/113; 351/153
(58) Field of Search ................................ 351/111, 153, 351/113, 114, 119, 41; 16/228

(56) References Cited

U.S. PATENT DOCUMENTS 4,818,093 A * 4/1989 Tabacchi ..................... 351/113

* cited by examiner

Primary Examiner—Hung Xuan Dang
(74) Attorney, Agent, or Firm—Kanesaka & Takeuchi

(57) ABSTRACT

An eyewear temple structure includes an attachment portion to be attached to a frame of an eyewear, and a temple attached to the attachment portion. The temple includes a housing having a hollow space therein, a front opening, a side opening, and a bump formed adjacent to the side opening. A guide member is slidably situated in the housing and includes a second projecting portion formed at one end to rotationally engage the attachment portion, and an abutment portion formed at the other end thereof. A compression coil spring is situated in the housing between the bump and the abutment portion to urge the guide member in a direction away from the bump. The temple is rotationally attached to the attachment portion through a resilient force of the coil spring.

9 Claims, 9 Drawing Sheets

OPENABLE EYEWEAR TEMPLE STRUCTURE

BACKGROUND OF THE INVENTION AND RELATED ART STATEMENT

The invention generally relates to an eyewear temple structure, in particular, a spring hinge provided on an eyewear temple. Common eyewear temples are generally categorized into rather wide temples made of metal or resin having low elasticity, and thinner temples using metal or resin having much elasticity. The present invention relates to a spring hinge which is provided particularly on the former rather wide temples made of metal or resin having low elasticity and enables the temple to open with elasticity.

FIG. 9 is a sectional view of the main components of a conventional spring hinge box 70. A core rod 71 is inserted in a spring 73 as a sliding member, and it is surely difficult to use a member of wide diameter for a coil spring between the box and core rod. The rate of occurrence of damage to the spring part by using a thin spring is considerably high.

FIGS. 10A–10C are explanatory drawings in which the spring hinge box 70 is used on a low-elasticity and wide temple 11y. If one attempts to make the width m smaller as in FIG. 10B, a small spring hinge box surely must be used. If so, as in FIG. 10C, as the vertical width 2h of the temple becomes greater, the force F, having twisted and turned left and right, comes to be applied more in the vicinity of a comma part 55 and a shaft screw 55a by the principle of a lever, and it becomes a cause of damage to the comma or projection part and shaft screw.

As shown in FIGS. 11A and 11B, this problem may be solved if the spring hinge box 71 is made larger and the spring hinge member inside is made larger, but the bulk width increases, it becomes more bulky and hard to handle and is aesthetically spoiled. Also, the weight of the temple part and a force for opening and bending are increased and are directly applied to the spring. Thus, serious accidents of bending of the screw also may occur.

An object of the present invention is to provide an eyewear temple with a spring hinge, which solves the problems described previously, and reduces damages to the hinge comma part, shaft screw and spring.

Another object of the invention is to provide an eyewear temple, which is made easier to handle so as not to be bulky, and is made so as not to be aesthetically spoiled.

Further objects and advantages of the invention will be apparent from the following description of the invention.

SUMMARY OF THE INVENTION

In an embodiment of the invention, on the front end of a metal temple, there is provided a hexahedral housing part, in which the front face and one side face of a front end are opened and the remaining four faces become walls. On the inner wall of another side face of the housing part and in the center of the opened front face, there is formed a bump serving as a spring stopping element, which is pierced by a blind hole for fastening screw. A U-shaped guide member has a comma part on each of the two free ends, wherein each of the comma parts is made to project inward from the front face of the temple front end, such that at least the comma shaft hole does not overlap with the inner corner part of the vertical wall of the temple. The guide member is tightly held in the temple housing part so as to be capable of sliding in the longitudinal direction of the temple.

A compression coil spring is housed within the two arms and the bottom part or abutment portion of the U-shaped guide member and the bump serving as the spring stopping element, so as to be capable of expanding and contracting in the longitudinal direction of the temple.

There is prepared a cover member, which has at least two through-holes for screws. One of the through-holes for screws is made to align with the blind hole for fastening screw of the spring stopping element, and the other is made to align with a blind hole for fastening screw, which is opened on the temple side face further back from the housing part. The open side of the temple is closed by the cover member and is fixed by screws, and a comma part on the frame side and the comma parts on both ends of the U-shaped guide member are connected by a shaft screw so as to be capable of opening out and swiveling.

By adopting the structure, it has become possible to provide the invention while reducing the damage to the above-mentioned comma parts, shaft screw, and spring, and without spoiling the aesthetics of the temple. Also, repair also has become easier to perform.

DETAILED DESCRIPTION OF PREFERRED EMBODIMENTS

Figure 1:
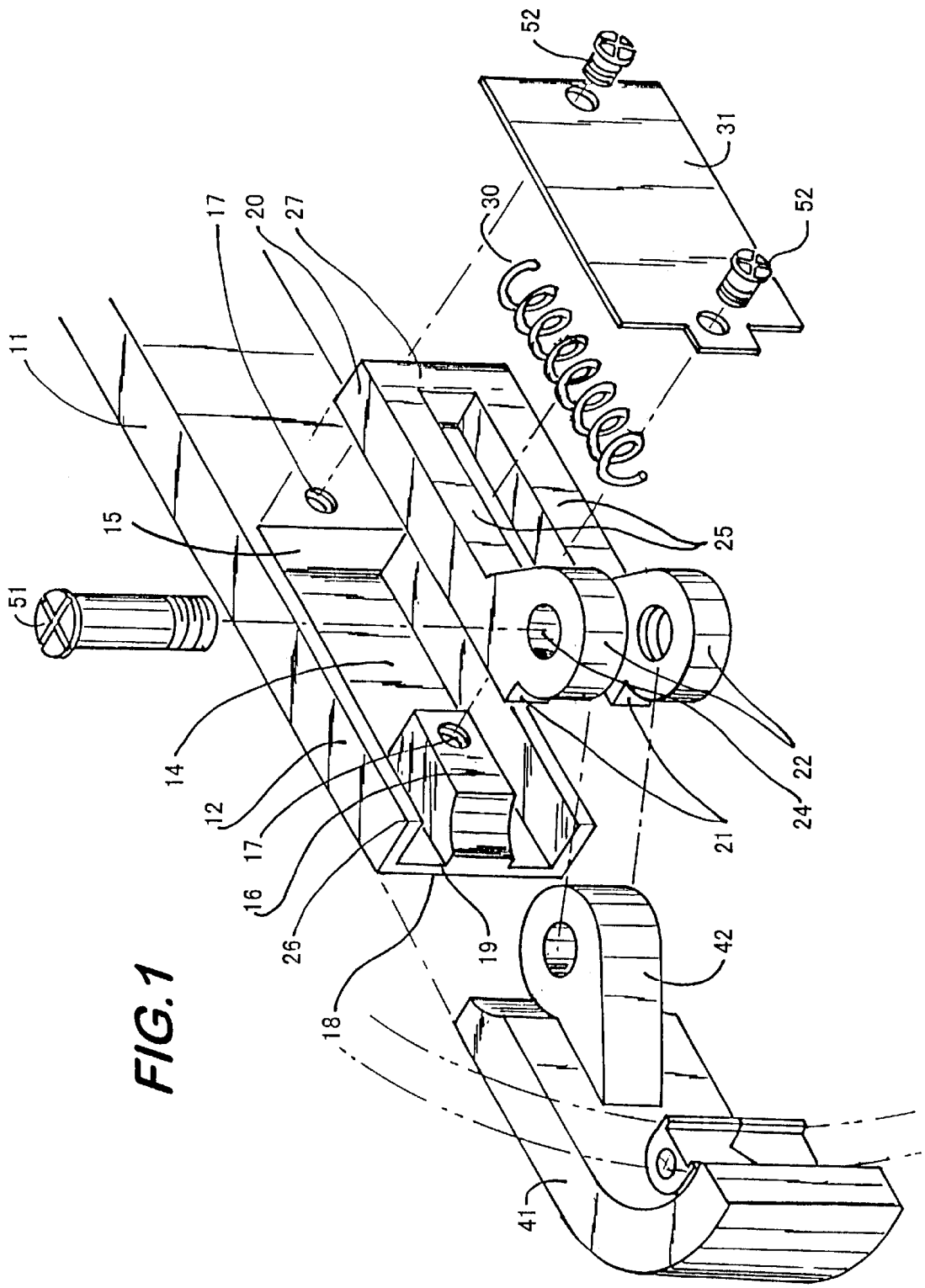
FIG. 1 is an exploded perspective view of a spring hinge part of a temple of the first embodiment of the present invention.

In FIG. 1, on a front end 12 of a metal temple 11, there is provided a hexahedral housing part 14, in which a front face 15 and one side face 13 of the front end 12 are opened and the remaining four faces become walls. On an inner wall 19 of another side face 18 of the housing part and in the center of the opened front face, there is formed a bump 16 serving as a spring stopping element, which is pierced by a blind hole 17 for fastening screw.

A U-shaped guide member 20 has a comma or projection part 22 on each of two free ends 21. Each of the comma parts 22 is made to project inward from the front face of the temple front end, such that at least a shaft hole 24 does not overlap with an inner corner part 26 of the vertical wall of the temple. The guide member 20 is tightly held in the temple housing part 14 so as to be capable of sliding in the longitudinal direction of said temple.

A compression coil spring 30 is housed within the two arms 25, a bottom or abutment part 27 of the U-shaped guide member 20 and the bump 16 serving as spring stopping element, so as to be capable of expanding and contracting in the longitudinal direction of the temple. There is prepared a cover member 31 which has at least two through-holes for screws, wherein one of the through-holes for screws is made to align with the blind hole 17 for fastening screw of the spring stopping element, and the other is made to align with a blind hole 17' for fastening screw which is opened on the temple side face further back from the housing part. The open side of the temple is closed by the cover member 31 and is fixed by fastening screws 52. Also, a comma or projection part 42 on an armor or attachment 41 and the comma parts 22 on both ends of the U-shaped guide member are connected by a shaft screw 51 so as to be capable of opening and swiveling. Also, an end 41a of the armor 41 is located at a side of the projection part 42, and the side face 18 is located at a side of the comma parts 22.

Figure 7A:
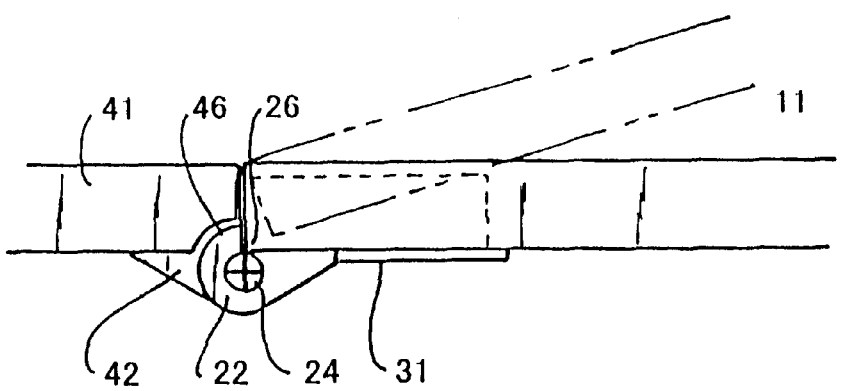
FIG. 7A is a plan view of the main components assembled from the state in FIG. 1.
Figure 7B:
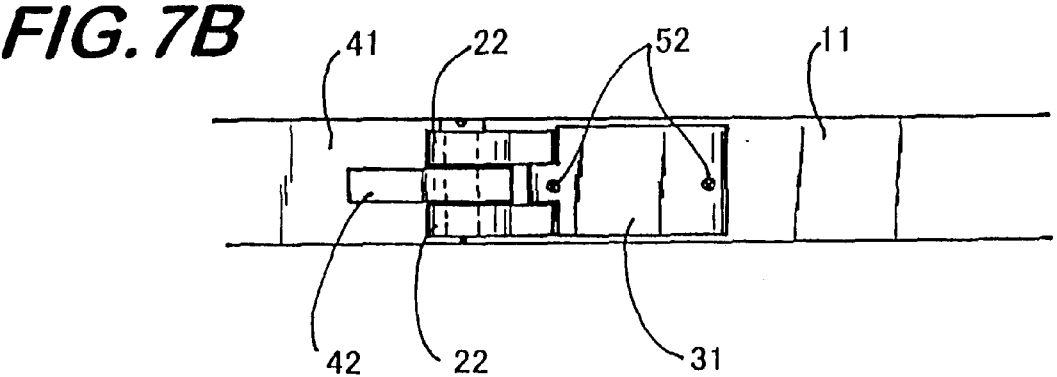
FIG. 7B is a front view of the main components assembled from the state in FIG. 1.

FIG. 7A is a plan view of the main components which are assembled from the state in the above-mentioned FIG. 1, and FIG. 7B is a side view seen from the inside. The end 41a abuts against the side face 18 when the temple 11 is opened. Also, in the drawing, each projection part 22 is made to project inward from the front face of the temple front end, to the minimum distance at which the shaft screw 51 can be inserted into the shaft hole and can be fixed by screw driver, such that at least the shaft hole 24 does not overlap with the inner corner part 26 of the vertical wall of the temple.

If the shaft hole is provided further inward of the minimum distance, it would no longer be possible to fix the shaft screw. Thus, in the state in which the outer perimeter 46 of each comma or projection part is inserted into the temple, at least the shaft hole 24 does not overlap with the inner corner part 26 of the vertical wall of the temple. In this state, the attachment portion is the least bulky in the temple and is preferable.

Figure 8A:
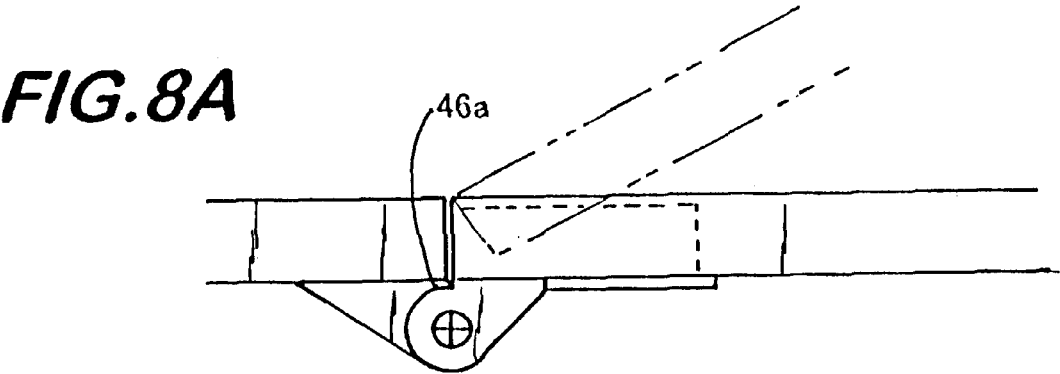
FIG. 8A is a plan view of a modified example of FIG. 7A.
Figure 8B:
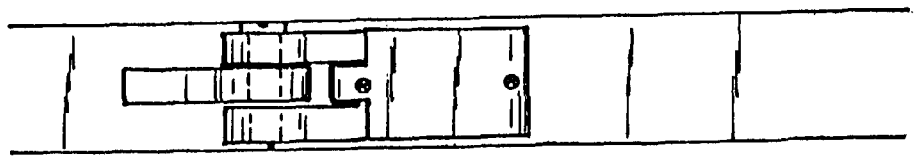
FIG. 8B is a front view of a modified example of FIG. 7A.

However, of course, it will be fine even in the conventional structure in which the outer perimeter 46a of each comma or projection part is made to contact with or spaced apart from the inside face of the temple or the inside face of the frame, as in FIG. 8A and FIG. 8B. When viewed from the manufacturing method and number of steps, the example of the latter structure in FIG. 8A and FIG. 8B is more simple, but in the aspect of aesthetics and easy handling, the example of the structure in FIG. 7A and FIG. 7B is of course preferable.

Also, it goes without saying that the positions of the comma or projection part provided on the frame and the comma or projection part on the temple side must be made to overlap. Also, as is understood in FIG. 7B or FIG. 8B, everybody knows that it can be taken apart if the screw is removed when broken, and there is no more need for manuals which may be lost immediately. Also, as is clearly understood in FIG. 1, replacement of the spring is very easy, because it is not the case that a core rod passes through the spring and one end is fixed, and it can be removed as it is with a pin set and a new spring can be housed as it is in the same place.

Figure 2:
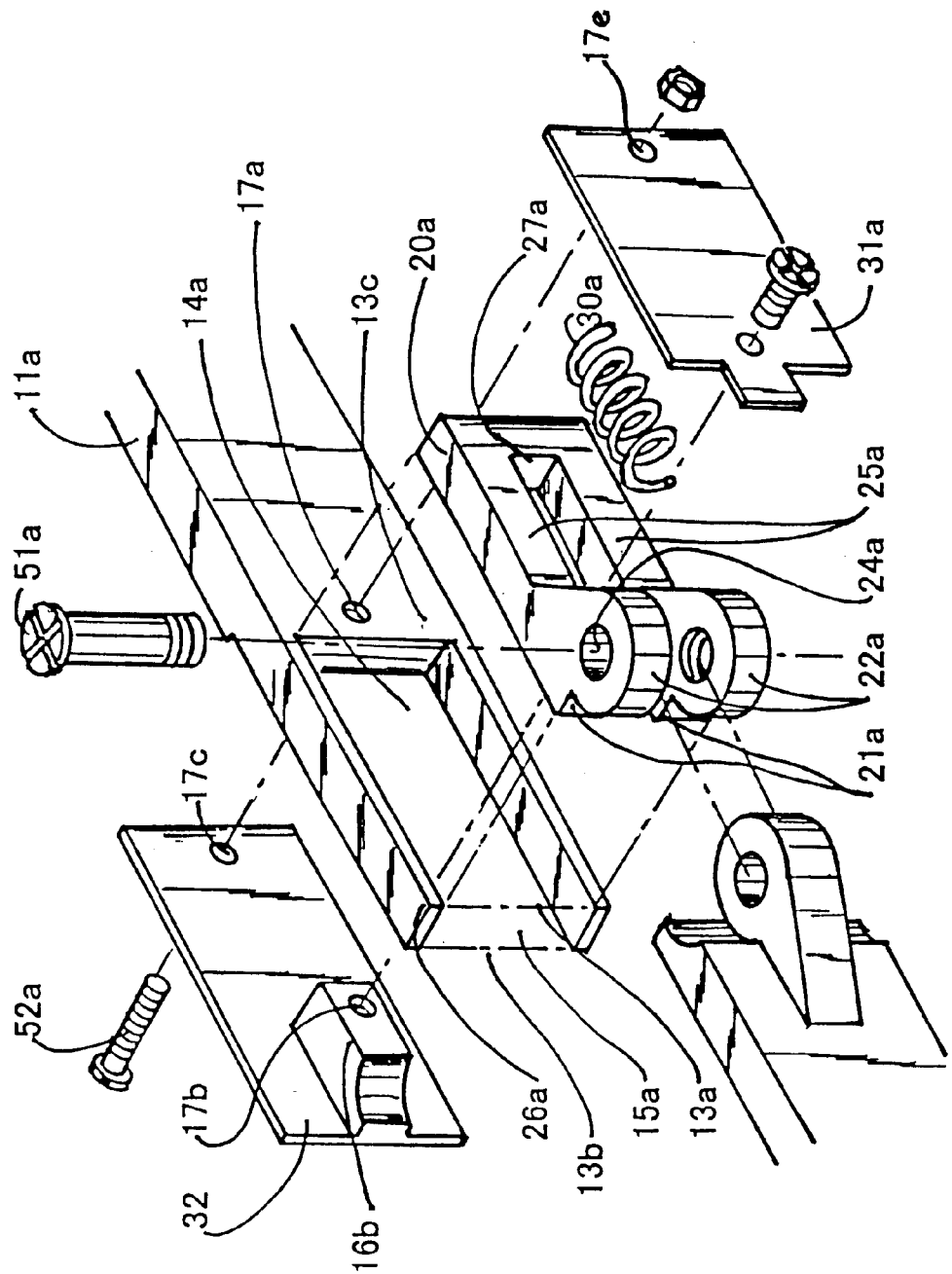
FIG. 2 is an exploded perspective view of the spring hinge part of the temple of the second embodiment of the present invention.

FIG. 2 is a perspective view of the second embodiment. There is provided a hexahedral housing part 14a, in which a front face 15a and both side faces 13a, 13b of the front end of the metal temple 11a are opened and the remaining three faces become walls. On the temple side face 13c further back from the housing part 14a, there is opened at least one through-hole 17a for fastening screw.

A U-shaped guide member 20a has a projection part 22a on each of the two free ends 21a. There are prepared two covers 31a, 32 that close both side faces of the metal temple front end. On either one of them, there is provided a bump 16a serving as a spring stopping element, which has a hole 17b for fastening screw, so as to block the center of the front face of the metal temple front end, and at the back of the cover, there is provided a through-hole 17c for fastening screw.

Also, on the other cover, there are provided through-holes 17d, 17e for fastening screws in the positions corresponding with the screw holes of the cover. The cover 32 which has the bump 16a serving as the spring stopping element having the hole 17b for fastening screw is provisionally fixed by a screw 52a in the through-hole 17a for fastening screw on the side face of the metal temple. Each of the projection parts 22a of the U-shaped guide member 20a is made to project inward from the front face of the temple front end, such that at least a shaft hole 24a does not overlap with the inner corner part 26a of the temple, and the guide member is tightly held in the metal temple housing part 14a so as to be capable of sliding in the longitudinal direction of the temple.

A compression coil spring 30a is housed within the two arms 25a, the bottom part 27a of the U-shaped guide member and the bump 16a serving as the spring stopping element, so as to be capable of expanding and contracting in the longitudinal direction of the metal temple 11a. The other cover 31a closes the other open side face of the metal temple housing part by a nut to the fastening screw 52a used for the provisional fastening on the side face of the metal temple, and a fastening screw fixed on the cover having the bump serving as spring stopping element. Also, a comma or projection part on the side of the frame and the comma or projection parts on both ends of the U-shaped guide member 20a are connected by a shaft screw 51a so as to be capable of opening and swiveling.

Figure 3:
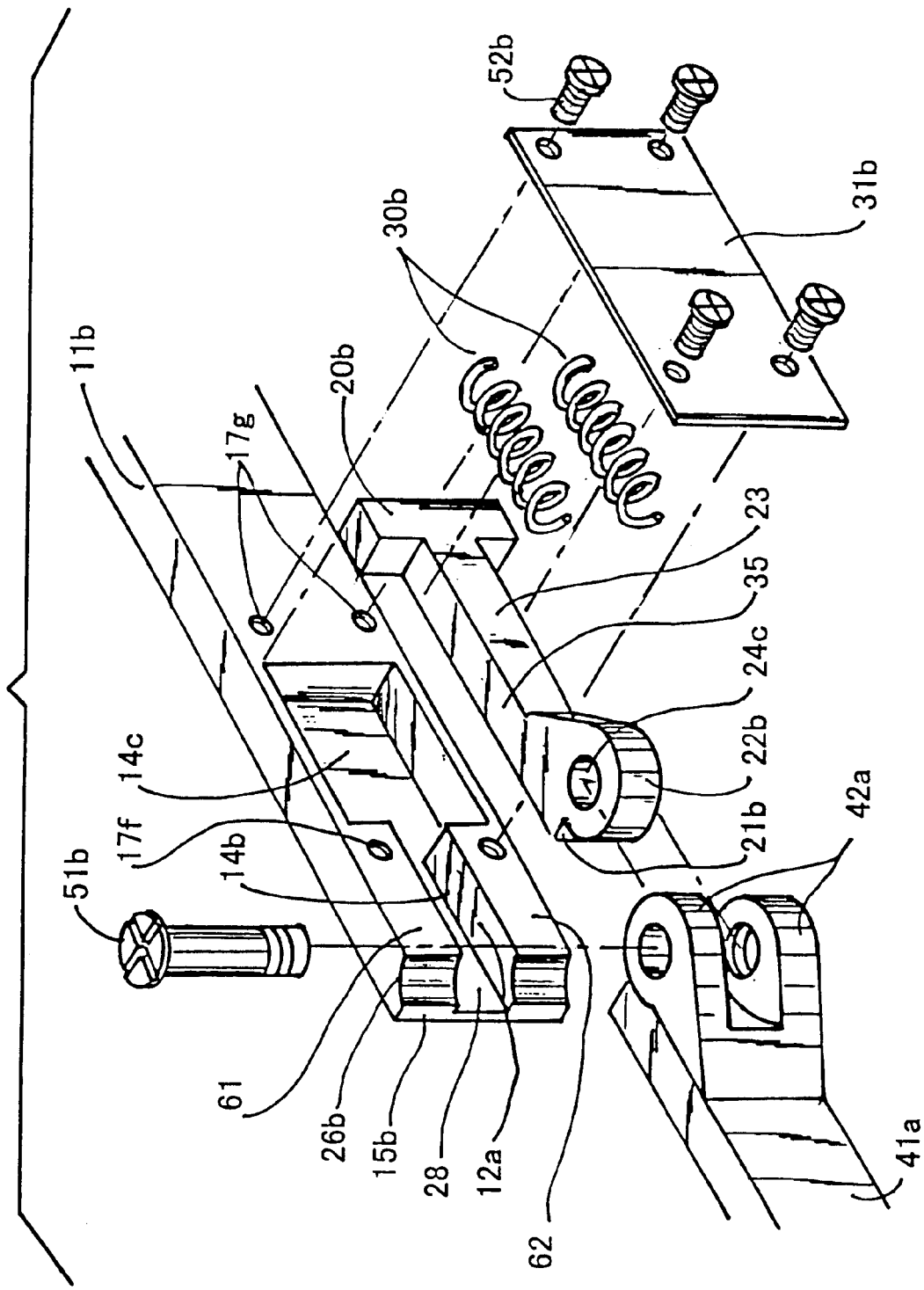
FIG. 3 is an exploded perspective view of the spring hinge part of the temple of the third embodiment of the present invention.

FIG. 3 is a perspective view of the third embodiment of the present invention. There is provided a first housing part 14b for sliding of a guide bar, which has an opening in the center of one side face 12a which continues from a center 28 of the front face 15b of the front end of a metal temple 11b. Continuing from the center 28, there is provided a second housing part 14c further back from the back of the first housing part, which is vertically wider than the first housing part and has the same side face opened. There are provided holes 17f for fastening screws on an upper part 61 and a lower part 62 of the open side face of the front end of the metal temple 11b, and there are provided holes 17g for fastening screws on the side face on the back of the second housing part 14c.

A T-shaped guide member 20b has a center column 23 with the T-shape as the guide bar 35, and has a projection part 22b on the free end 21b of the guide bar 35. The projection part 22b is made to project inward from the front face of the temple front end, such that at least the shaft hole 24c does not overlap with the inner corner part 26b of the temple, and the guide member 20b is held in the first housing part 14b and the second housing part 14c so as to be capable of sliding in the longitudinal direction of the temple. Two compression coil springs 30b are housed respectively in two gaps between the vertical wall of the second housing part 14c and the center column 23 of the T-shaped guide member.

There is prepared a cover member 31b which is provided with screw holes to meet with the holes 17f, 17g for fastening screws provided on the side face of the metal temple, and the side face openings of the first housing part 14b for sliding of the guide bar and the second housing part 14c for housing of the guide member are closed by the cover member 31b and fixed by screws. Also, two comma or projection parts 42a on the frame side and the comma or projection part 22b on the free end of the T-shaped guide bar on the temple side are connected by a shaft screw 51b so as to be capable of opening and swiveling.

Figure 4:
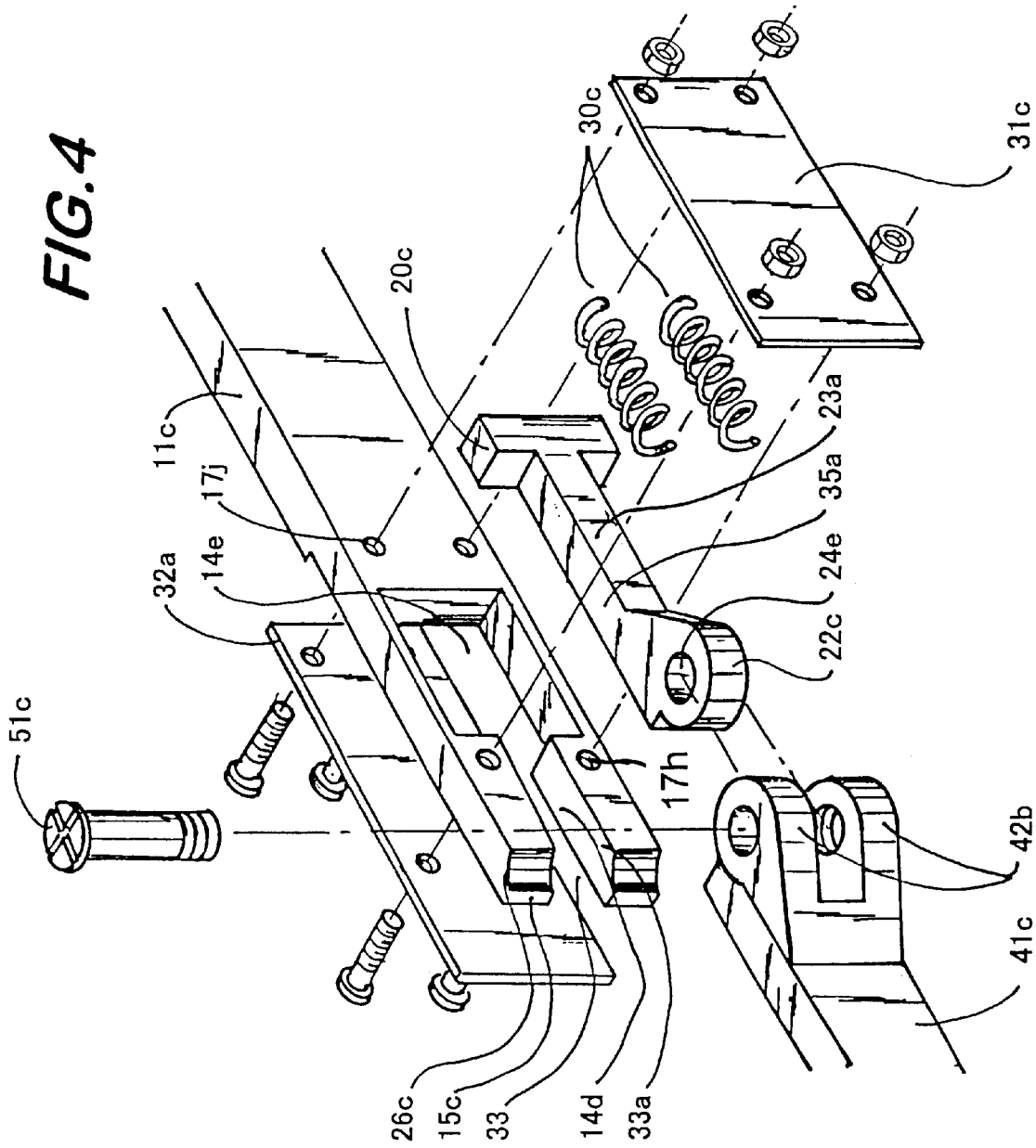
FIG. 4 is an exploded perspective view of the spring hinge part of the temple of the fourth embodiment of the present invention.

Next, FIG. 4 is the fourth embodiment of the present invention. There is provided a first housing part 14d for sliding of a guide bar, which has openings 33, 33a on both side faces continuing from the center of the front face 15c of the front end of a metal temple 11c. Also, a second housing part 14e continues further back from the back of the first housing part, which is wider than the first housing part and has the same two side faces opened. There are provided through-holes 17h for fastening screws respectively on the upper part and the lower part of the front end of the metal temple, and there are provided through-holes 17j for fastening screws on the side face on the back of the second housing part 14e.

A T-shaped guide member 20c uses a center column 23a of the T-shape as a guide bar 35a and has a comma or projection part 22c on the free end of the guide bar 35a. The comma part 22c is made to project inward from the front face of the temple front end, such that at least a shaft hole 24e does not overlap with the inner corner part 26c of the temple. The guide member is tightly held in the first housing part 14d for sliding of the guide bar and the second housing part 14e so as to be capable of sliding in the longitudinal direction of the temple.

Two compression coil springs 30c are housed respectively in two gaps between the vertical wall of the second housing part 14e and the center column 23a of the T-shaped guide member. Two cover members 32a, 31c are prepared. There are provided screw holes also on the two cover members so as to meet with the through-holes 17h, 17j for screws provided on the side face of the metal temple, and the two open side faces of the first and second housing part are closed by the two cover members. Also, two comma or projection parts 42b on the frame 41c side and the comma part 22c on the free end of the T-shaped guide bar on the temple side are connected by a shaft screw 51c so as to be capable of opening and swiveling.

Figure 5:
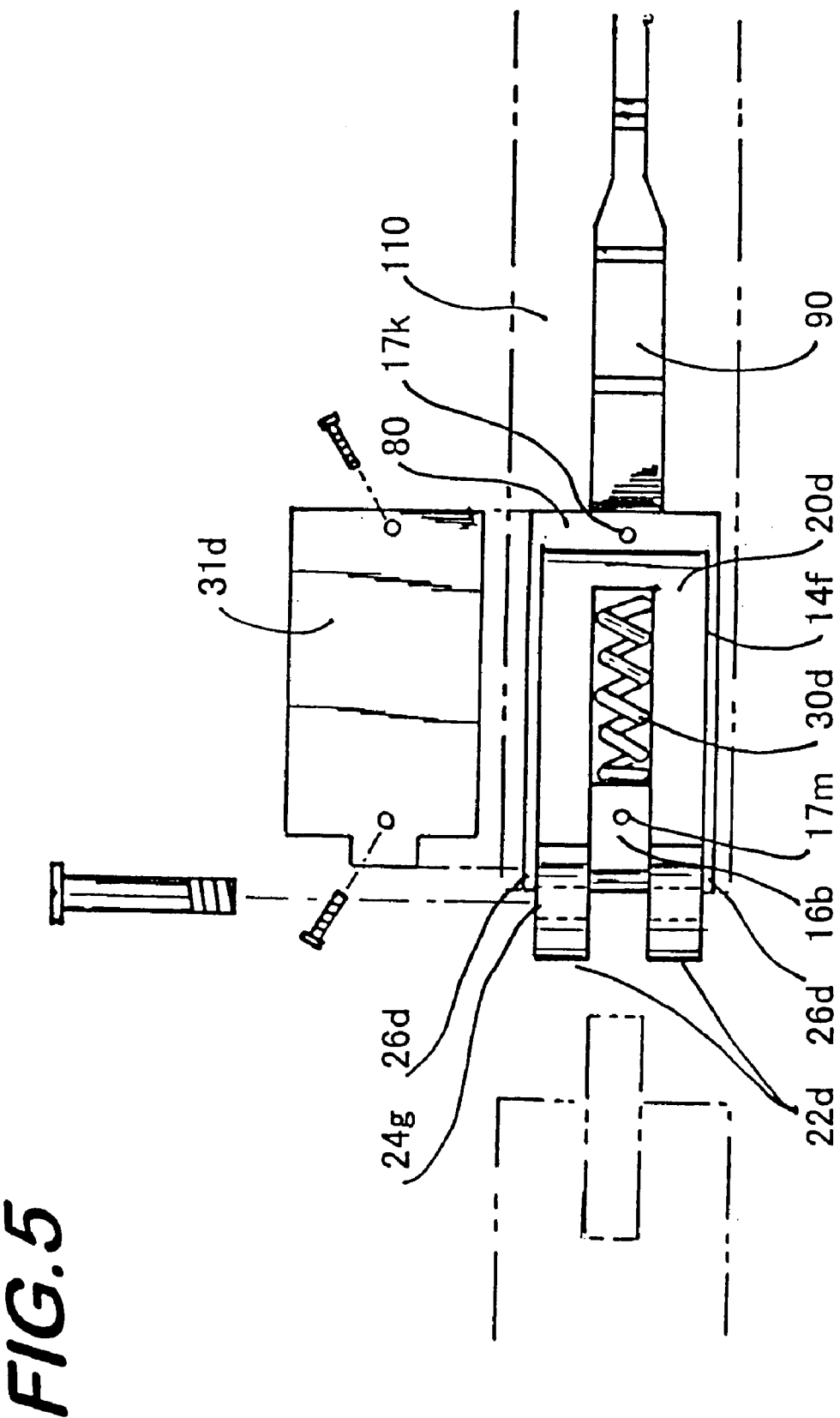
FIG. 5 is a front view from the inside of the spring hinge part of the temple of the fifth embodiment of the present invention.

FIG. 5 is the fifth embodiment of the present invention. There is provided a housing part 14f, in which a front face and one side face of a hexahedral metal box 80 are opened and the remaining four faces become walls. On the inner wall of another side face and in the center of the opened front face, there is formed a bump 16b serving as a spring stopping element, which is pierced by a blind hole 17m for fastening a screw. The side face on the back of the housing part is made to have the width and thickness such that a blind hole 17k for fastening screw can be provided.

A U-shaped guide member 20d has a comma or projection part 22d on each of the two free ends. Each of the comma parts is made to project inward from the front face of the metal box, such that at least shaft holes 24g do not overlap with the inner corner part 26d of the vertical wall of the metal box. The guide member is tightly held in the housing part of the metal box so as to be capable of sliding in the longitudinal direction of the metal box, and a compression coil spring 30d is housed within the two arms, the bottom part of the U-shaped guide member and the bump serving as a spring stopping element, so as to be capable of expanding and contracting in the longitudinal direction of the temple.

There is provided a cover member 31d which has at least two through-holes for screws, wherein one of the through-holes for screws is made to align with the blind hole for fastening screw of the spring stopping element, and the other is made to align with the blind hole 17k for fastening screw which is opened on the thickened wall face further back from the housing part. The opened one side face of the metal box is closed by the cover member and fixed by screws. On the outer wall face on the back of the hexahedral metal box 80, there is provided a metal core 90 which is inserted into a resin temple 110. The metal core is inserted from the front end of the resin temple 110, and the hexahedral metal box is inserted up to the front end of the resin temple and is fixed. Also, a comma or projection part on the frame side and the comma or projection parts on both ends of the U-shaped guide member are connected by a shaft screw so as to be capable of opening and swiveling.

Figure 6:
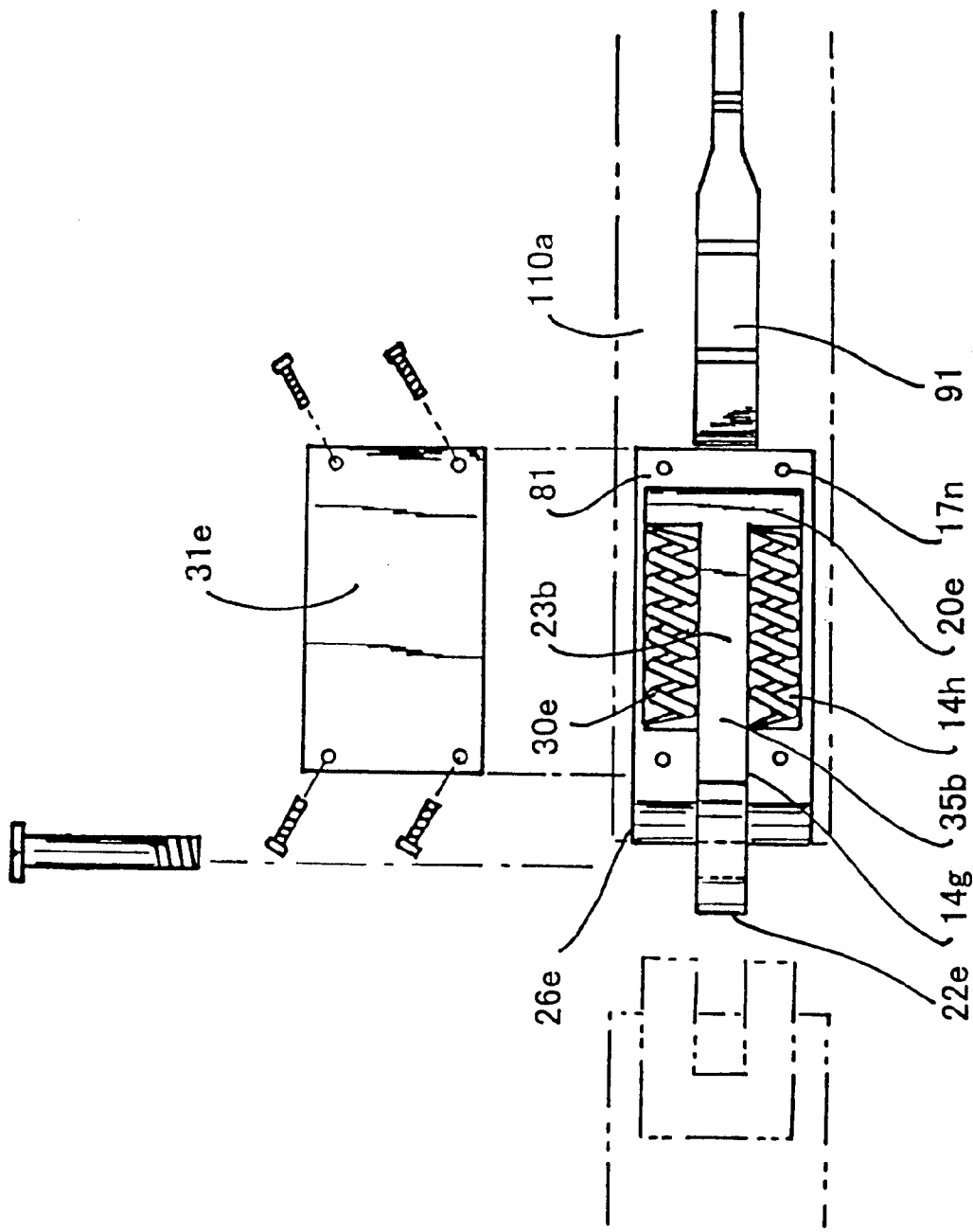
FIG. 6 is a front view from the inside of the spring hinge part of the temple of the sixth embodiment of the present invention.

FIG. 6 is the sixth embodiment of the present invention. There is provided a first housing part 14g for sliding of a guide bar, which continues from one side face to a center of the front face of a hexahedral metal box 81, and a second housing part 14h continues further back from the first housing part, which is wider than the first housing part and has the same side face opened. There are provided holes for fastening screws on the upper part and the lower part of the open side face of the front end of the metal box, and there are provided holes 17n for fastening screws on the side face on the back of the second housing part 14h.

A T-shaped guide member 20e uses the center column 23b of the T-shape as the guide bar 35b, and has a comma or projection part 22e on the free end 21b of the guide bar. The comma or projection part is made to project inward from the front face of the temple front end, such that at least a shaft hole does not overlap with the inner corner part 26e of the metal box. The guide member is tightly held in the first housing part for sliding of the guide bar and the second housing part so as to be capable of sliding in the longitudinal direction of the metal box.

Two compression coil springs 30e are housed respectively in two gaps between the vertical wall of the second housing part and the center column of the T-shaped guide member. A cover member 31e is prepared, and has screw holes for meeting with the holes for fastening screws on the open side face of the front end of the metal box and the side face of the back of the second housing part. The open side faces of the first housing part for sliding of the guide bar and the second housing part for housing the guide member are closed by the cover and fixed by screws.

On the outer wall face on the back of the hexahedral metal box 81, there is provided a metal core 91 which is inserted into a resin temple 110a. The metal core is inserted from the front end of the resin temple 110a, and the hexahedral metal box is inserted up to the front end of the resin temple and is fixed. Also, a comma or projection part on the frame side and the comma or projection parts on both ends of the U-shaped guide member are connected by a shaft screw so as to be capable of opening and swiveling.

Figure 9:
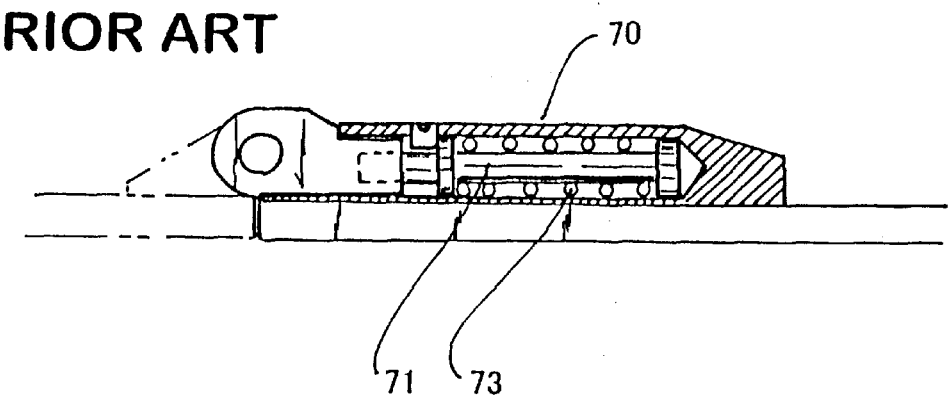
FIG. 9 is a sectional view of the main components of a conventional spring hinge.
Figure 10A:
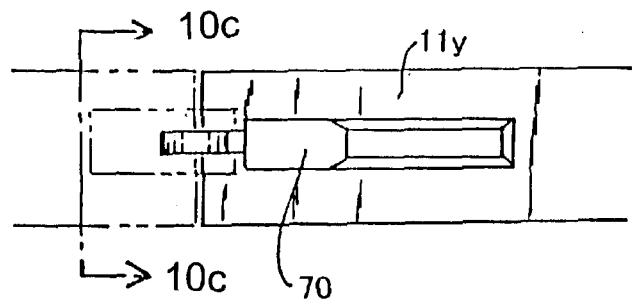
FIG. 10A is a front view when the conventional spring hinge is used on a wide temple.
Figure 10B:
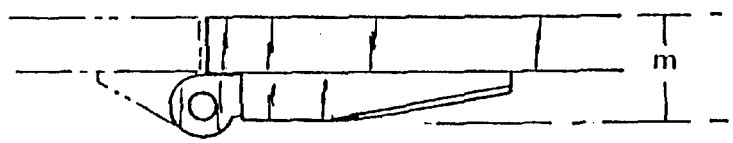
FIG. 10B is a plan view of FIG. 10A.
Figure 10C:
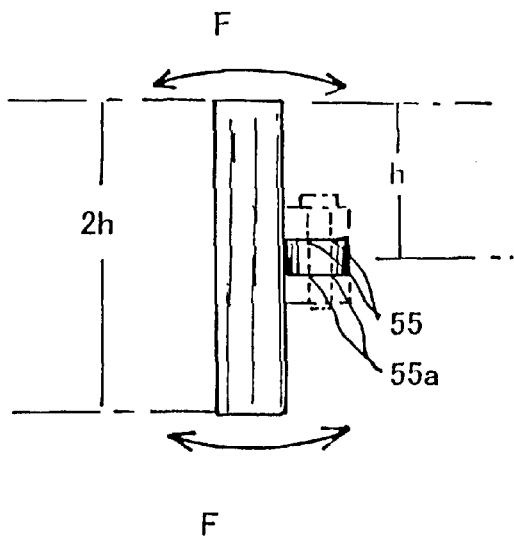
FIG. 10C is an enlarged view of the main components taken along line 10C—10C in FIG. 10A.
Figure 11A:
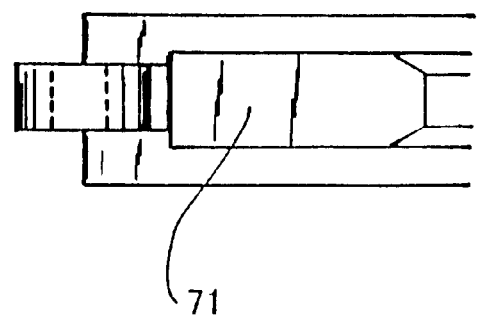
FIG. 11A is a front view for explaining when the spring hinge is made larger.
Figure 11B:
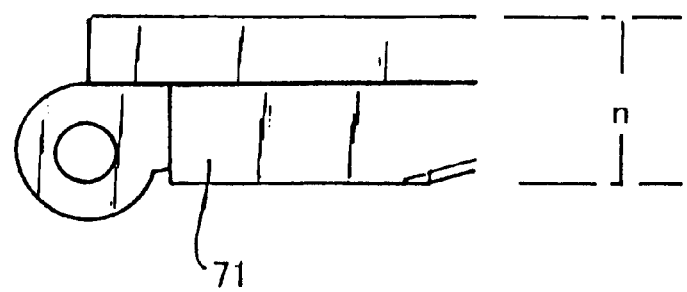
FIG. 11B is a plan view of FIG. 11A.
Figure 12:
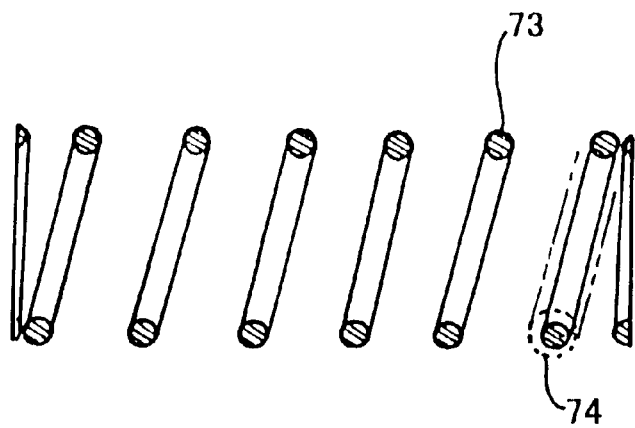
FIG. 12 is a sectional view of the spring.

In the present invention, because it is sufficient even without inserting the core rod 71 inside the spring 73 as in the prior He art in FIG. 9, the diameter 74 of the spring material can be made thicker as shown in FIG. 12, and in a wide temple, it is possible to sufficiently withstand the spreading, bending, and twisting forces. Also, according to the present invention as noted above, concerning the use of a wide temple made of metal or resin, it is sufficient even if the box does not become bulky as in the conventional spring hinge, it can be made more shapely in design, and it contributes to the prevention of the occurrence of damage due to insufficient strength and the prevention of the occurrence of damage to the projection part and the shaft screw due to stress. Moreover, it contributes to the simplification of the operation when disassembling and repairing, quick response at the retail store is possible, and it can greatly increase customer satisfaction.

While the invention has been explained with reference to the specific embodiments of the invention, the explanation is illustrative and the invention is limited only by the appended claims.

What is claimed is:

1. An eyewear temple structure comprising:

an attachment portion to be attached to a frame of an eyewear and having an end and a first projecting portion with a hole therein projecting inwardly of the eyewear from the attachment portion to be located at a side of the end;

a temple to be attached to the attachment portion and including a housing having a hollow space therein, a front opening formed at a front side of the housing, a side face abutting against the end when the temple is opened, a side opening formed in the side face and communicating with the hollow space, and a bump formed adjacent to the side opening in the hollow space;

a guide member situated in the hollow space to slide along a longitudinal direction of the temple, and including a second projecting portion having a hole and formed at one end to project inwardly of the eyewear from the housing to rotationally engage the first projecting portion, and an abutment portion formed at the other end thereof;

a shaft situated in the holes of the first and second projecting portions to rotationally connect the guide member to the attachment portion so that when the temple is opened relative to the attachment portion through the shaft, the end and the side face located adjacent to the shaft abut against each other, a compression coil spring situated in the housing between the bump and the abutment portion to urge the guide member in a direction away from the bump so that the temple is rotationally attached to the attachment portion through a resilient force of the coil spring, and when the temple is pushed outwardly of the eyewear in a condition that the end and the side face abut against each other, the temple rotates outwardly around a part of the side face while the compression coil is being compressed; and a cover member attached to the housing to close the front opening.

2. An eyewear temple structure according to claim 1, wherein said guide member includes two arms having the abutment portion therebetween to have a space between the two arms, in which said coil spring is disposed.

3. An eyewear temple structure according to clame 2, wherein said bump is integrally formed with the housing and has a hole for receiving a screw to attach the cover to the housing.

4. An eyewear temple structure according to claim 3, wherein said housing has a metal core extending to a temple portion made of resin.

5. An eyewear temple structure according to claim 2, wherein said housing has two lateral side portions to have the front and side openings and a back opening, and said bump has a back plate to cover the back opening and attached to the housing.

6. An eyewear temple structure according to claim 1, wherein said guide member has a T-shape to have two abutment portions; said bump has two bump portions facing the two abutment portions; and two compressing coils are disposed between the two abutment portions and two bump portions.

7. An eyewear temple structure according to claim 6, wherein said housing has a back opening, which is closed by a back plate attached to the housing.

8. An eyewear temple structure according to claim 7, wherein said housing has a metal core extending to a temple portion made of resin.

9. An eyewear temple structure according to claim 1, wherein said temple further includes a back side opposite to the front opening, said back side having a flat surface to smoothly contact the compression coil spring.

\* \* \* \* \*